United States Patent
Tokoi et al.

(10) Patent No.: US 7,972,742 B2
(45) Date of Patent: Jul. 5, 2011

(54) TUBE TYPE FUEL CELL TO DECREASE CURRENT PATH LENGTH

(75) Inventors: Hiromi Tokoi, Tokai (JP); Shin Takahashi, Hitachi (JP); Akira Gunji, Hitachinaka (JP); Nariyoshi Kobayashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1104 days.

(21) Appl. No.: 11/505,302

(22) Filed: Aug. 17, 2006

(65) Prior Publication Data

US 2007/0048578 A1    Mar. 1, 2007

(30) Foreign Application Priority Data

Aug. 29, 2005   (JP) .................................. 2005-247409

(51) Int. Cl.
    *H01M 8/24*    (2006.01)
(52) U.S. Cl. ..................... 429/468; 429/517; 429/466
(58) Field of Classification Search .................. 429/31, 429/32, 34, 466, 468, 517
    See application file for complete search history.

(56) References Cited

U.S. PATENT DOCUMENTS

| | | | |
|---|---|---|---|
| 4,791,035 A * | 12/1988 | Reichner | 429/456 |
| 5,006,031 A | 4/1991 | Fossing et al. | |
| 5,597,335 A | 1/1997 | Woodland | |
| 5,613,814 A | 3/1997 | Jackson | |
| 5,632,661 A | 5/1997 | Jurgens et al. | |
| 5,713,293 A | 2/1998 | Shifler et al. | |
| 5,774,876 A | 6/1998 | Woolley et al. | |
| 5,795,199 A | 8/1998 | Langenberg et al. | |
| 5,823,225 A | 10/1998 | Erickson et al. | |
| 5,908,122 A | 6/1999 | Robinett et al. | |
| 5,947,051 A | 9/1999 | Geiger | |
| 6,269,763 B1 | 8/2001 | Woodland | |
| 6,321,673 B2 | 11/2001 | Lelan et al. | |
| 6,352,399 B1 | 3/2002 | Martin et al. | |
| 6,427,615 B1 | 8/2002 | Ku | |
| 6,474,254 B1 | 11/2002 | Ambs et al. | |
| 6,494,159 B2 | 12/2002 | Sirmalis et al. | |
| 6,496,765 B1 | 12/2002 | Robinett, III et al. | |
| 2003/0134170 A1 * | 7/2003 | Sarkar et al. | 429/31 |

FOREIGN PATENT DOCUMENTS

JP    2002-329508    11/2002

(Continued)

OTHER PUBLICATIONS

NEDO Report, 2002, by TOTO Co., Ltd.

(Continued)

*Primary Examiner* — Dah-Wei D Yuan
*Assistant Examiner* — Zachary Best
(74) *Attorney, Agent, or Firm* — Antonelli, Terry, Stout & Kraus, LLP.

(57) ABSTRACT

It is an object to shorten current path between an anode and a cathode in a tube type SOFC and thereby to decrease resistance. The tube type fuel cell contains a tube type electrolyte placed between an anode and a cathode, wherein an auxiliary electrode is provided over the entire region of a cell reaction region on at least one of the anode and cathode. The current path is shortened and resistance is decreased, because the anode auxiliary electrode or cathode auxiliary electrode is provided over the entire peripheral surface of the anode or cathode, and the current path in the auxiliary electrode has a greatly increased cross-sectional area.

10 Claims, 6 Drawing Sheets

FOREIGN PATENT DOCUMENTS

| | | |
|---|---|---|
| JP | 2003-272668 | 9/2003 |
| JP | 2005-174846 | 6/2005 |
| WO | WO 03/069705 | 8/2003 |
| WO | WO 03/100881 | 12/2003 |
| WO | WO 2004/012287 | 2/2004 |

OTHER PUBLICATIONS

Office Action issued in Japanese Patent Application No. 2005-247409 on Mar. 18, 2010.

* cited by examiner

TUBE TYPE FUEL CELL TO DECREASE CURRENT PATH LENGTH

FIELD OF THE INVENTION

The present invention relates to a tube type fuel cell, in particular solid oxide fuel cell (SOFC).

BACKGROUND OF THE INVENTION

A fuel cell comprises an electrolyte placed between an anode (fuel electrode) and a cathode (air electrode). It is a power generator, supplied with a fuel gas on the anode side and an oxidant gas on the cathode side to generate power by the electrochemical reactions between the fuel and oxidant via the electrolyte. A solid oxide fuel cell as one type of fuel cells efficiently generates power and, at the same time, allows fuel reforming reactions to proceed within the cell, because it operates at high temperature of 600 to 1000° C. It can potentially generate power at a lower cost than other fuel cell types, because it can be supplied with diversified fuels and work by a simple fuel cell system. It naturally discharges exhaust gases of high temperature, which can be reused more easily. Moreover, it can be easily combined with another system to form a cogeneration system, or with gas turbine to form a hybrid system.

SOFCs fall into two general categories by solid electrolyte shape, tube type and plate types. A tube type shape is more resistant to thermal stresses than a plate type, and this is a major advantage for an SOFC, which operates at high temperature.

However, a tube type shape involves a problem that it generally has a higher internal resistance than a plate shape, resulting from a longer current path in a tube type fuel cell (hereinafter referred to as tube type cell). Higher internal resistance causes problems of deteriorating cell characteristics, e.g., power generation efficiency and output density. Moreover, it also involves restrictions in connection of unit cells to each other, which makes it difficult to enhance volumetric energy density.

One prior art is Non-Patent Document 1 describing such a background.

Non-Patent Document 1: NEDO Report, 2002, by TOTO Co., Ltd.

BRIEF SUMMARY OF THE INVENTION

A tube type cell has a current path running from the anode to the cathode along the periphery, which increases path length and electrical resistance.

It is an object of the present invention to decrease current path length and hence resistance in a tube type cell.

Other objects, features and advantages of the invention will become apparent from the following description of the embodiments of the invention taken in conjunction with the accompanying drawings.

DESCRIPTION OF REFERENCE NUMERALS

Figure 1:
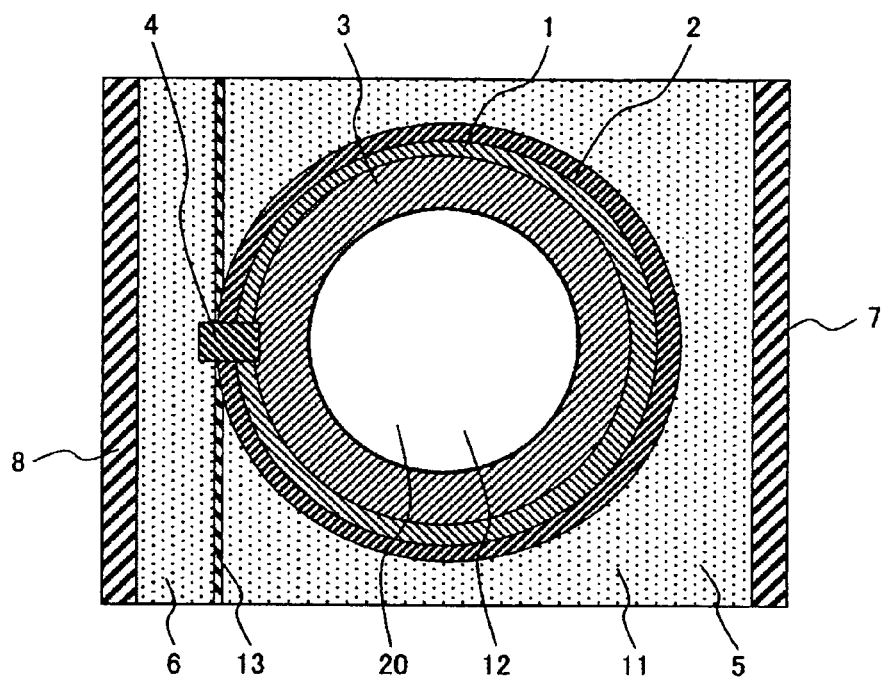
FIG. 1 is a lateral cross-sectional view illustrating one embodiment of the present invention.

1 Solid electrolyte
2 Anode
3 Cathode
4 Interconnector
5 Anode auxiliary electrode
6 Cathode-side auxiliary current-collecting electrode
7 Anode-side current-collecting electrode
8 Cathode-side current-collecting electrode
11 Fuel region
12 Cathode auxiliary electrode
13 Electrically insulating sheet
16 Air introduction tube
17 Air
16 Fuel
19 Cell case
20 Oxidation region

DETAILED DESCRIPTION OF THE INVENTION

The present invention provides a tube type cell comprising: an anode; a cathode; and an electrolyte placed between the anode and the cathode; wherein an anode auxiliary electrode and a cathode auxiliary electrode are provided over the entire region of cell reaction regions on the anode and the cathode, respectively, or an auxiliary electrode is provided over the entire region of a cell reaction region on one of the anode or the cathode.

The present invention relates to a tube type cell, where the tube type cell contains not only a tube type (cylindrical type) but also an elliptic type and a flat tube type. All of these shapes are generically named tube type.

In the present invention, an anode auxiliary electrode and a cathode auxiliary electrode are preferably gas-permeable assuredly for a fuel gas and oxidant gas. More specifically, they are made of an electroconductive, porous material with through-holes.

Moreover, each auxiliary electrode is preferably made of a material having a lower resistivity than that for the corresponding anode or cathode.

The anode auxiliary electrode of one cell is preferably electrically insulated from that for adjacent cell, to which the former cell is connected in series, by an adequate means, e.g., electrically insulating sheet.

The anode auxiliary electrode and the cathode auxiliary electrode may be provided in such a way that each fills a fuel region around the anode or oxidation region around the cathode, or a fuel and oxidation regions are provided around the anode or cathode auxiliary electrode, respectively.

A plurality of the tube type cells of the present invention may be connected to each other in series or in parallel, where the unit cells may be connected to each other in zigzags.

Figure 2:
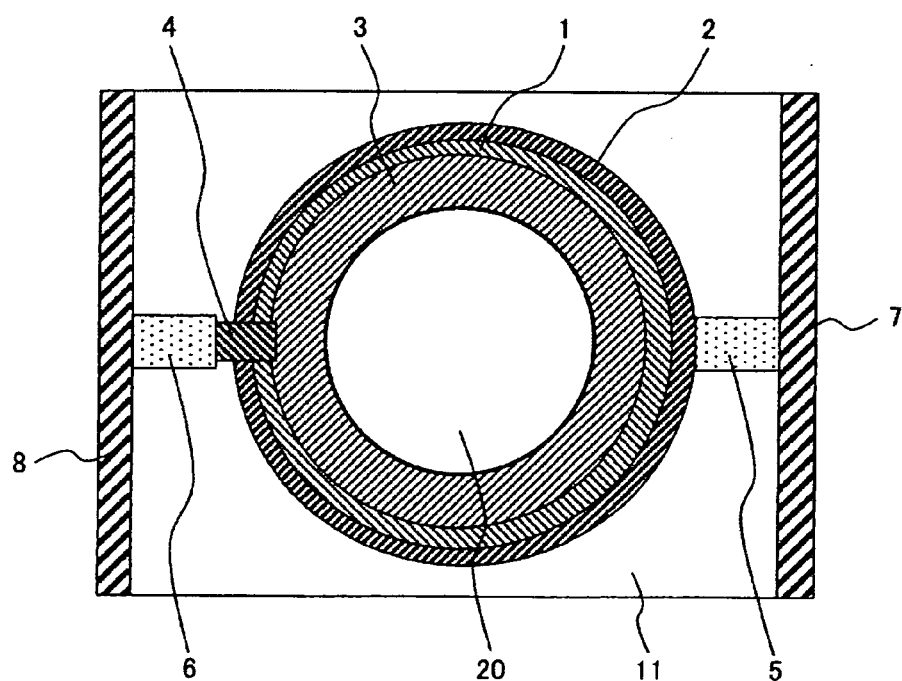
FIG. 2 is a cross-sectional view illustrating a cell of comparative example.

The tube type SOFC with the anode auxiliary electrode provided in part of the cell reaction region around the anode is described by FIG. 2. The cell comprises the solid electrolyte 1 placed between the anode 2 on the outer side and cathode 3 on the inner side, and the interconnector 4 to draw the cathode current. Current from the cell passes through the anode auxiliary electrode 5 and cathode auxiliary electrode 6 to be collected by the respective anode-side current-collecting electrode 7 and cathode-side current-collecting electrode 8. A fuel, e.g., hydrocarbon-based fuel, flows in the fuel region 11 provided over the outer peripheral surface of the cell and an oxidant, e.g., air, flows in the oxidation region 12 provided over the inner peripheral surface of the cell.

Figure 3:
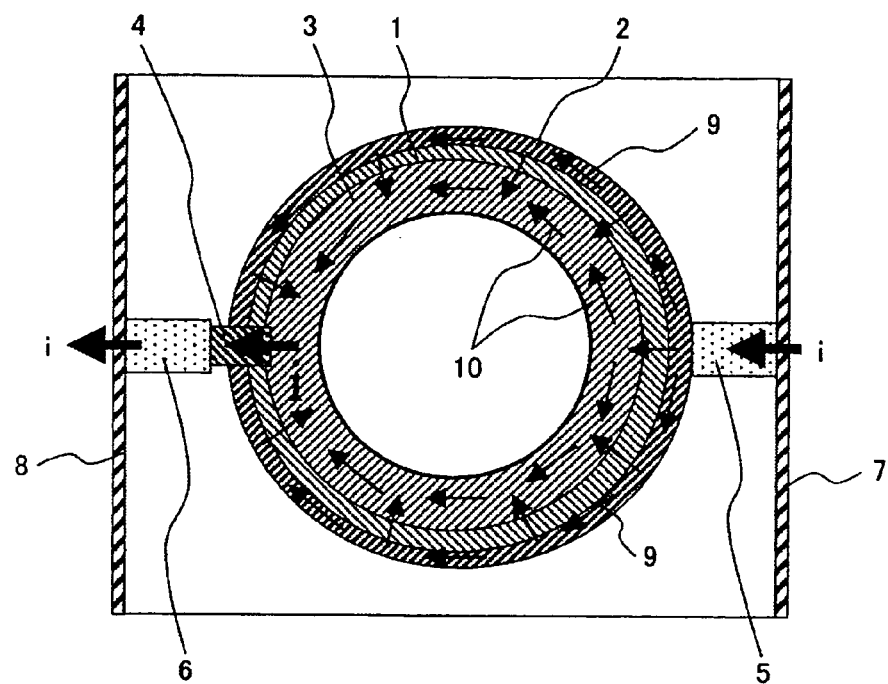
FIG. 3 is a cross-sectional view illustrating current paths of a cell of comparative example.

FIG. 3 schematically illustrates current flowing in the cell. The current path from the anode-side current-collecting electrode 7 to the cathode-side current-collecting electrode 8 is described. The current "i" flows from the anode-side current-collecting electrode 7 into the anode 2 via the anode auxiliary electrode 5. The current from the anode 2 passes through the solid electrolyte 1 and reaches the cathode 3. However, part of the current flows along the periphery, as illustrated by the arrows 9, by which is meant that the current passes through the solid electrolyte 1 while being dispersed. This results in increased length of the current path in the anode, and hence increased cell internal resistance.

Similarly, the current from the solid electrolyte 1 partly flows along the periphery, as illustrated by the arrows 10, in the cathode 3, also resulting in increased length of the current path in the cathode and hence increased cell internal resistance.

FIGS. 2 and 3 illustrate the cell in which the anode is provided outside of the tube. However, the similar phenomena will occur when the anode is provided inside of the tube and the cathode outside of the tube.

Examples of the present invention are described below for the cell in which the anode is provided outside of the cell tube.

EXAMPLE 1

FIG. 1 is a lateral cross-sectional view illustrating the tube type cell of Example 1. It comprised the solid electrolyte 1 placed between the anode 2 on the outside and the cathode 3 on the inside, and the interconnector 4 at one position on the cell periphery to draw current from the cathode 3. The solid electrolyte 1 was made of yttrium-stabilized zirconia (YSZ), formed into a closed tube shape. The anode 2 was made of a porous cermet of nickel and YSZ, and the cathode 3 was made of lanthanum manganite. In this structure, a fuel flows in the fuel region 11 provided over the outer cell peripheral surface and an oxidant gas (air) flows in the oxidation region provided over the inner cell peripheral surface.

The anode auxiliary electrode 5 was provided in such a way to cover the outer peripheral surface of the anode 2. It was made of a highly electroconductive, porous material with through-holes to have a structure for allowing the anode gas to flow without encountering a much flow resistance.

Similarly, the cathode auxiliary electrode 12 was provided in such a way to cover the inner peripheral surface of the cathode 3. It was made of a highly electroconductive, porous material with through-holes to have a structure for allowing the cathode gas to flow without encountering a much flow resistance.

The cathode-side auxiliary current-collecting electrode 6 was mounted on the interconnector 4 to draw the cathode current, and connected to the cathode-side current-collecting electrode 8. The cathode-side auxiliary current-collecting electrode 6 was provided in such a way to fill the space between the interconnector 4 and cathode-side current-collecting electrode 8. The cathode-side auxiliary current-collecting electrode 6 and anode auxiliary electrode 5 were separated from each other by the electrically insulating sheet 13, to prevent electrical contact between them.

Each of the cathode-side auxiliary current-collecting electrode 6 and anode auxiliary electrode 5 was made of a nickel-based metallic material, cathode auxiliary electrode of a chromium-based metallic material, and electrically insulating sheet 13 of alumina-based metallic material.

Figure 9:
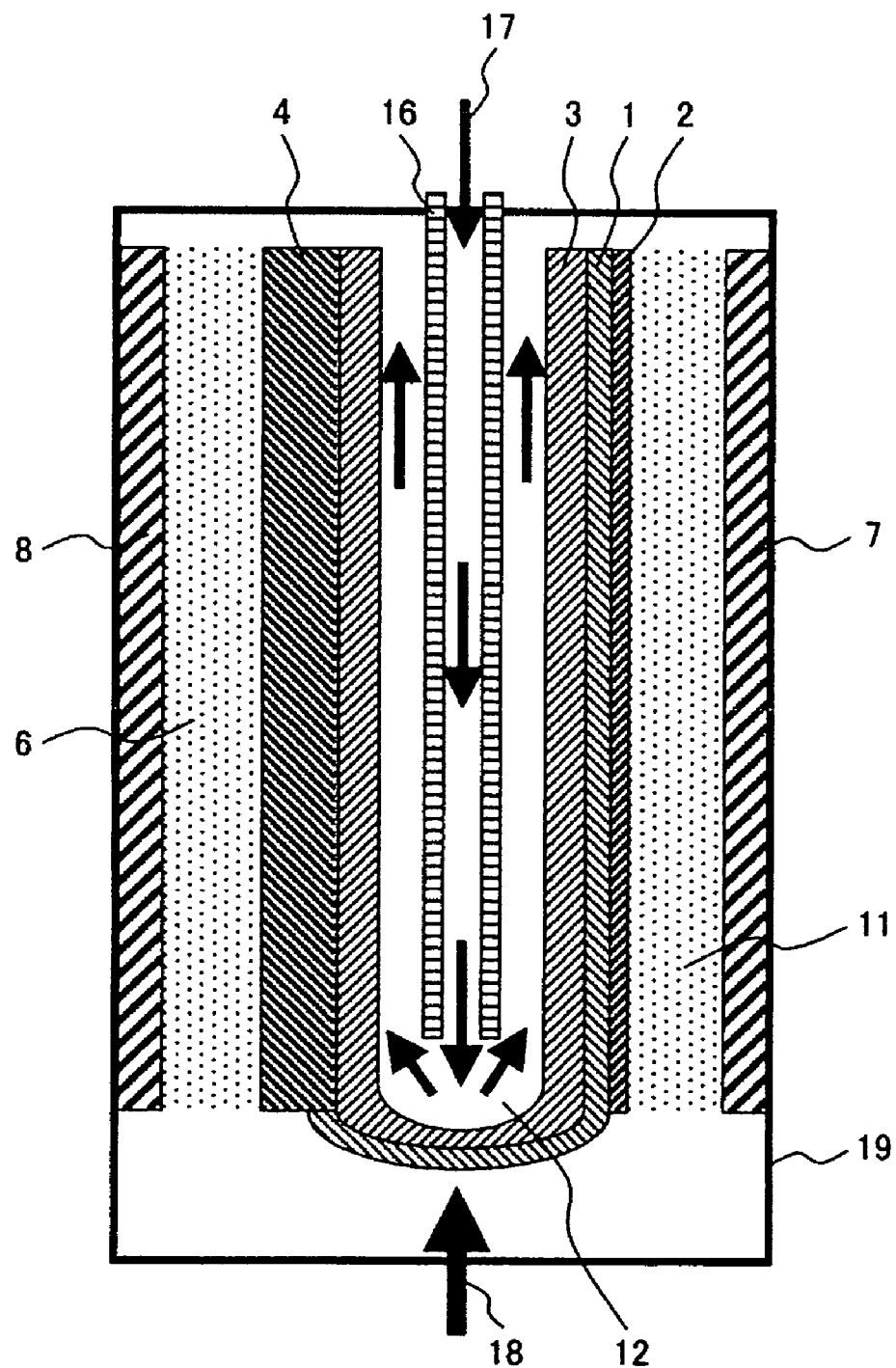
FIG. 9 is a longitudinal cross-sectional view illustrating one embodiment of the present invention.

FIG. 9 is a longitudinal cross-sectional view illustrating the tube type cell of Example 1. The fuel 18 is supplied to the cell case 19 from the bottom, flowing upwards in the fuel region over the cell peripheral surface. On the other hand, air 17 is ejected from the air introduction tube 16, provided in the cell, flowing in the oxidation region 12 upwards. The cell shown in FIG. 9 has a closed tube shape, but it may be open at the bottom.

Next, the cell reactions are described.

First, the reactions are described with a hydrocarbon-based fuel reformed to produce the reformed gas containing hydrogen, where methane is taken as an example of hydrocarbon-based fuel.

Methane and hydrogen react with each other over a reforming catalyst to produce hydrogen, the reforming reactions being mainly represented by the formula (1).

A common reforming catalyst is a nickel- or ruthenium-based bone.

$$CH_4 + H_2O = CO + 3H_2 \quad (1)$$

CO formed by the reaction (1) reacts with $H_2O$ by the reaction represented by the formula (2) (CO conversion reaction) to further produce hydrogen.

$$CO + H_2O = CO_2 + H_2 \quad (2)$$

The reaction to produce hydrogen from a hydrocarbon-based fuel is endothermic, and should be supplied with a heat to continuously proceed. It is generally necessary to keep the reforming catalyst at around 600 to 800° C.

The cell reactions (power generating reactions) proceed on the anode 2. They are represented by the formulae (3) and (4), and are exothermic.

$$H_2 + 1/2 O_2 = H_2O \quad (3)$$

$$CO + 1/2 O_2 = CO_2 \quad (4)$$

Figure 4:
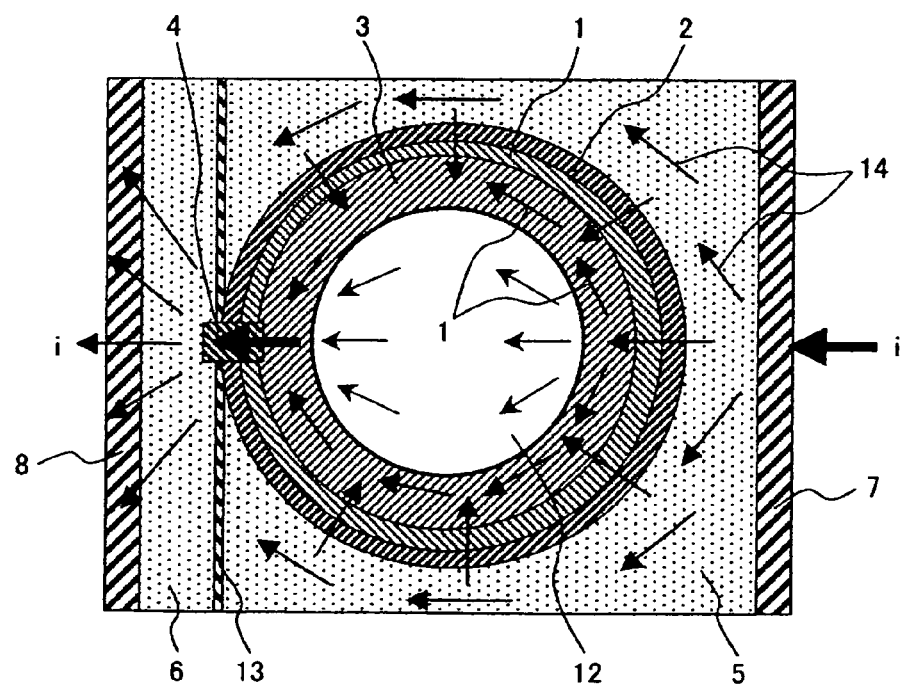
FIG. 4 is a cross-sectional view illustrating current paths of one embodiment of the present invention.

FIG. 4 schematically illustrates current flow in the cell. The current path from the anode-side current-collecting electrode 7 to the cathode-side current-collecting electrode 8 is described. The current "i" flows from the anode-side current-collecting electrode 7 into the anode 2 via the anode auxiliary electrode 5, as illustrated by the arrows 14. The current from the anode 2 passes through the solid electrolyte 1 and reaches the cathode 3.

The current path in the anode auxiliary electrode 5 is shorter than the path shown in FIG. 1, which runs along the periphery in the anode, because (a) the anode auxiliary electrode 5 is electrically connected to the entire peripheral surface which defines the anode 2, and (b) the current path in the anode auxiliary electrode 5 has a greatly increased cross-sectional area. Moreover, the anode auxiliary electrode 5 is made of a nickel-based metallic material, as described above, which has a resistivity about 1 digit lower than that of a cermet of nickel and YSZ for the anode. These reasons (a) and (b) and lower resistivety almost halve resistance in the anode shown in FIG. 2.

Similarly, the current path in the cathode auxiliary electrode 12 is shorter than the path shown in FIG. 3, which runs along the periphery in the cathode, because (c) the cathode auxiliary electrode 12 is electrically connected to the entire peripheral surface which defines the cathode 3, and (d) the current path in the cathode auxiliary electrode 12 has a greatly increased cross-sectional area. These reasons (c) and (d) reduce resistance in the cathode.

EXAMPLE 2

Figure 5:
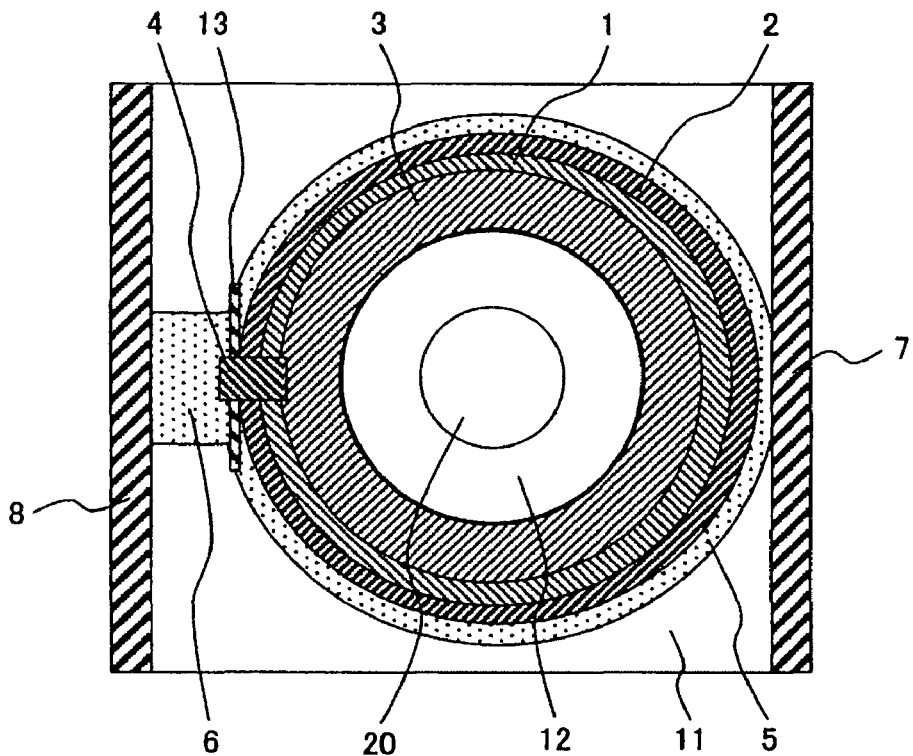
FIG. 5 is a cross-sectional view illustrating another embodiment of the present invention.

The tube type cell illustrated in FIG. 5 is similar to that illustrated in FIG. 1, except that the tube type anode auxiliary electrode 5 is provided to cover the outer peripheral surface of the anode 2. The tube type cathode auxiliary electrode 13 is provided to cover the inner peripheral surface of the cathode 3, as is the case with the one illustrated in FIG. 1. In the tube type cell of Example 2, the fuel region 11 is provided over the outer peripheral surface of the anode auxiliary electrode, and the oxidation region 20 is provided over the inner peripheral surface of the cathode auxiliary electrode. This structure can also reduce flow resistance of a fuel flowing in the fuel region 11 and of an oxidant flowing in the oxidation region 20. The resistance-reducing effect is smaller to some extent than that of the cell illustrated in FIG. 1; nevertheless, however, it is similar in that it is greatly improved as compared with the effect of the comparative cell.

EXAMPLE 3

Figure 6:
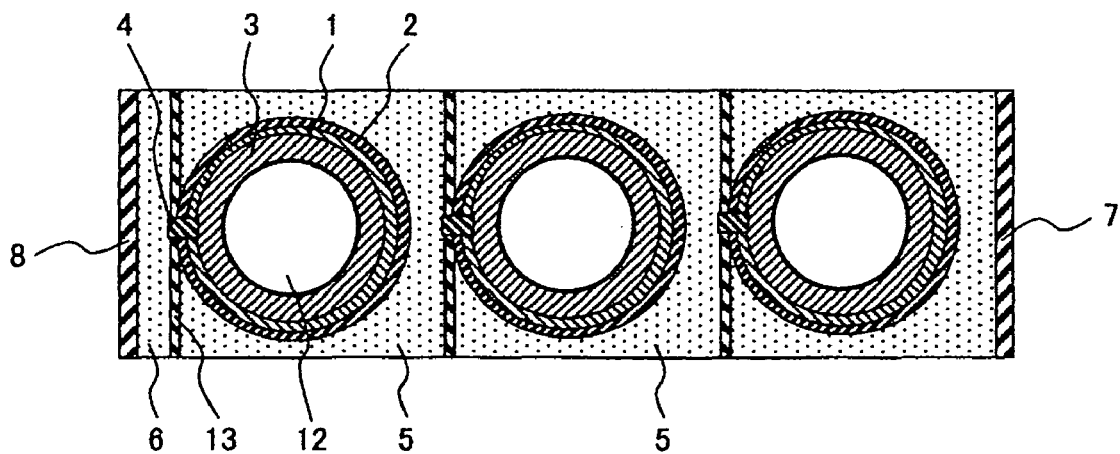
FIG. 6 is a cross-sectional view illustrating one variation of the present invention.
Figure 7:
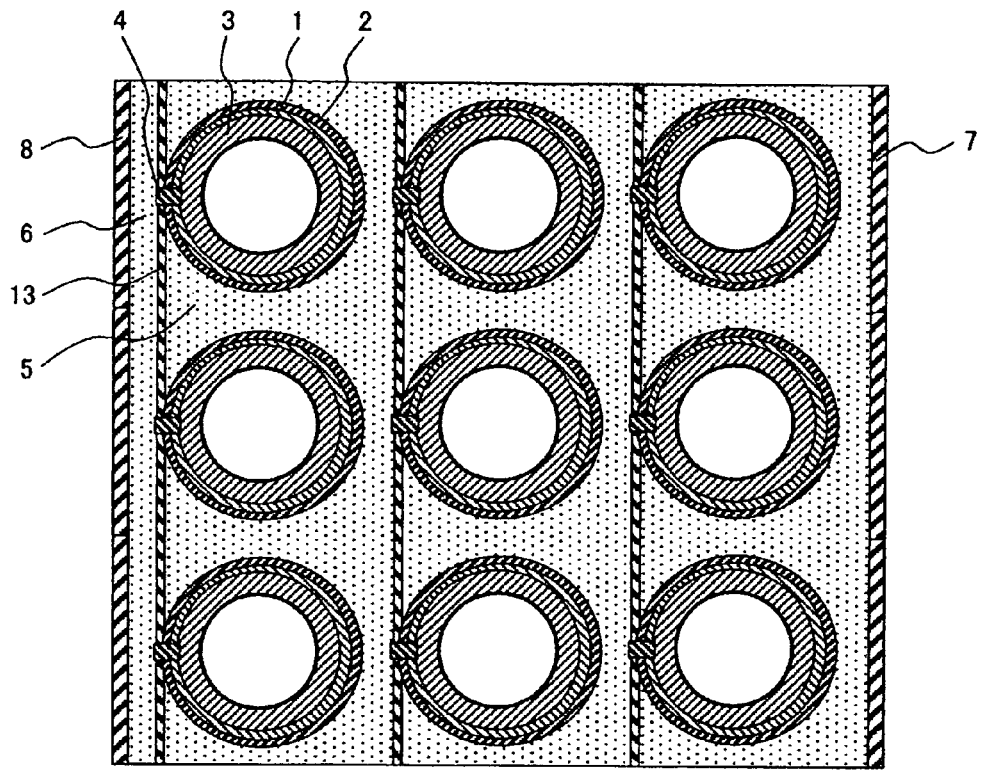
FIG. 7 is a cross-sectional view illustrating another variation of the present invention.
Figure 8:
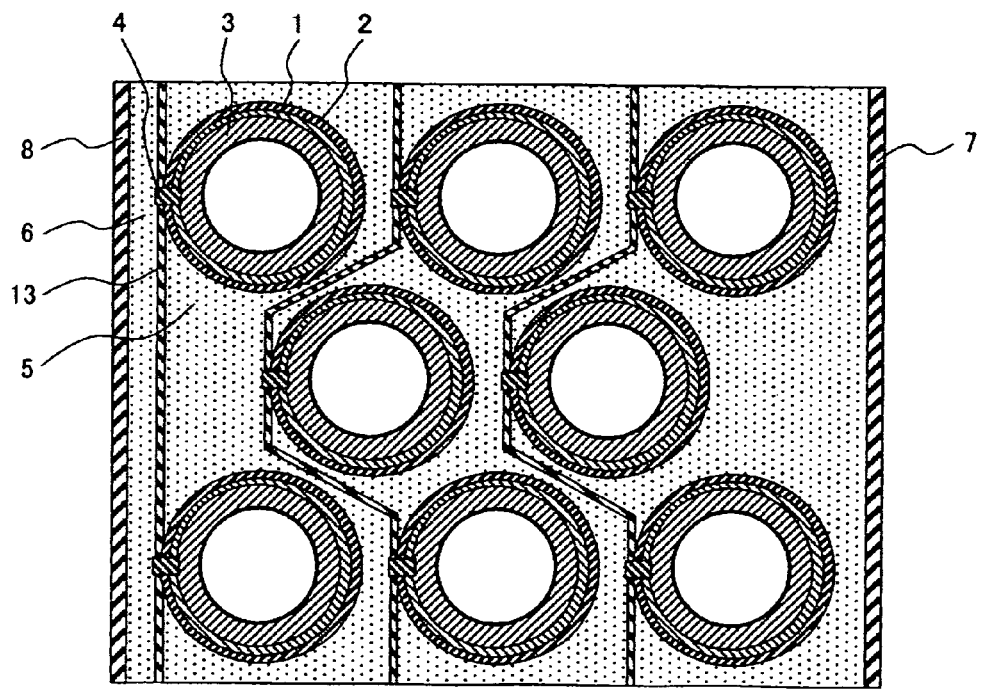
FIG. 8 is a cross-sectional view illustrating still another variation of the present invention.

FIGS. 6, 7 and 8 illustrate variations of the present invention. The variation illustrated in FIG. 6 comprises a plurality of the tube type cells of the structure illustrated in FIG. 1, connected in series. The variation illustrated in FIG. 7 comprises a plurality of the tube type cells (a total of nine cells in the figure) of the structure illustrated in FIG. 1, three being connected in series and three in parallel. As illustrated, a plurality of the tube type cells of the present invention can be easily connected in series or in parallel, to freely increase cell output.

FIG. 8 illustrates a cell arrangement different from that shown in FIG. 7 in that the cells are arranged in zigzags to increase number of the cells arranged in a unit area. This arrangement can increase volumetric energy density.

The tube type cell of the present invention is described with the anode provided over the outer cell peripheral surface. However, it can produce the similar effect when the cathode is provided over the outer peripheral surface.

Moreover, the concept of this invention is applicable to the anode and cathode simultaneously, or to one of them. Still more, the anode auxiliary electrode and the cathode auxiliary electrode are designed to work as the anode and cathode, respectively.

Figure 10:
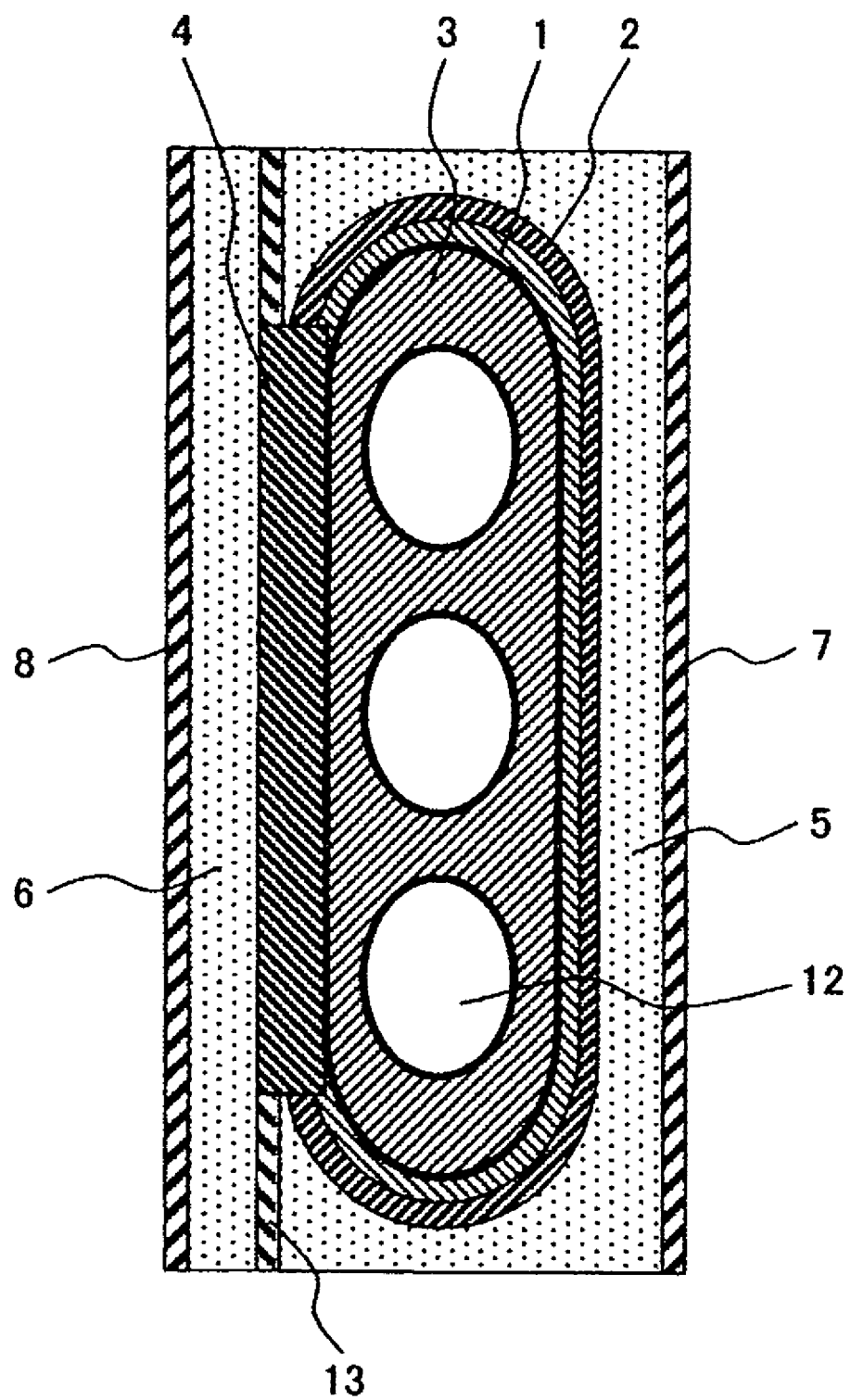
FIG. 10 is a longitudinal cross-sectional view illustrating a flat tube type cell as still another embodiment of the present invention.

The tube type cell, whether it is closed or open at the bottom, can similarly produce the effect of the present invention. Moreover, the concept of the present invention is applicable not only to the cell of tube type (cylindrical type) but also to those of elliptic type or flat tube type. FIG. 10 illustrates one example of the cells having a flat tube type. It is structurally the same as that illustrated in FIG. 1, except that the type is flat tube. The cathode 3 is provided with air supplying holes as the oxidation regions 12. The interconnector 4 is provided to run over about half of the flat tube surface.

It should be further understood by those skilled in the art that although the foregoing description has been made on embodiments of the invention, the invention is not limited thereto and various changes and modifications may be made without departing from the spirit of the invention and the scope of the appended claims.

ADVANTAGES OF THE INVENTION

The tube type cell of the present invention has a shortened current path and hence decreased resistance, because the anode auxiliary electrode or cathode auxiliary electrode is provided over the entire outer surface of the anode or cathode, and the current path in the auxiliary electrode has a greatly increased cross-sectional area.

The invention claimed is:

1. A tube type fuel cell comprising a plurality of tube type fuel cells, each tube type fuel cell comprising:
   an anode;
   a cathode;
   a tube type electrolyte placed between the anode and the cathode;
   an interconnector for drawing current from the cathode or the anode positioned on an inner side of the tube type electrolyte, wherein each of the plurality of tube type cells is electrically connected in series with each other via the interconnector;
   an auxiliary electrode provided over the entire region of a cell reaction region on the cathode or the anode positioned on an outer side of the electrolyte of the tube type cell; and
   an electrically insulating means provided between the adjacent auxiliary electrodes of the tube type cells electrically connected in series with each other via the interconnector.

2. The tube type fuel cell according to claim 1, wherein the auxiliary electrode is made of an electroconductive porous material having through-holes for passing a gas.

3. A tube type fuel cell comprising a plurality of tube type fuel cells, each tube type fuel cell comprising:
   an anode;
   a cathode;
   a tube type electrolyte placed between the anode and the cathode;
   a fuel region around the anode to pass a fuel;
   an oxidation region around the cathode to pass an oxidant;
   an interconnector for drawing current from the cathode or the anode positioned on an inner side of the tube type electrolyte, wherein each of the plurality of tube type cells is electrically connected in series with each other via the interconnector;
   an auxiliary electrode provided over the entire region of a cell reaction region on the cathode or the anode positioned on an outer side of the electrolyte of the tube type cell;
   wherein the fuel region or the oxidation region is provided adjacently to the auxiliary electrode; and
   an electrically insulating means provided between the adjacent auxiliary electrodes of the tube type cells electrically connected in series with each other via the interconnector.

4. A tube type fuel cell comprising a plurality of tube type fuel cells, each tube type fuel cell comprising:
   an anode;
   a cathode;
   a tube type electrolyte placed between the anode and the cathode;
   a fuel region around the anode to pass a fuel;
   an oxidation region around the cathode to pass an oxidant;
   an interconnector for drawing current from the cathode or the anode positioned on an inner side of the tube type electrolyte, wherein each of the plurality of tube type cells is electrically connected in series with each other via the interconnector;

an auxiliary electrode provided over the entire region of a cell reaction region on the cathode or the anode positioned on an outer side of the electrolyte of the tube type cell and filling the fuel region or the oxidation region;

an electrically insulating means provided between the adjacent auxiliary electrodes of the tube type cells electrically connected in series with each other via the interconnector.

5. A tube type fuel cell comprising a plurality of tube type fuel cells, each tube type fuel cell comprising:
- an anode;
- a cathode;
- a tube type electrolyte placed between the anode and the cathode;
- an interconnector for drawing current from the cathode or the anode positioned on an inner side of the tube type electrolyte, wherein each of the plurality of tube type cells is electrically connected in series with each other via the interconnector;
- an anode auxiliary electrode and a cathode auxiliary electrode provided over a cell reaction region on each of the anode and the cathode respectively, so that at least one of the auxiliary electrodes being provided over the entire region of the cell reaction region; and
- an electrically insulating means provided between the anode auxiliary electrode and the cathode auxiliary electrode to prevent electrical contact between them;

wherein each of the plurality of tube type cells are electrically connected with each other in series via the interconnector.

6. The tube type fuel cell according to one of claims 1 to 5, wherein the auxiliary electrode provided to cover the cell reaction region on at least one of the anode and the cathode is made of a nickel-containing porous material.

7. The tube type fuel cell according to claim 5, wherein the electrically insulating means provided between the anode auxiliary electrode and the cathode auxiliary electrode is an electrically insulating sheet.

8. The tube type fuel cell according to claim 5 or 7, wherein an alumina-containing ceramic is used as a material of the electrically insulating means.

9. A fuel cell assembly structure comprising the plurality of the tube type fuel cells according to claim 1, connected to each other in series or in parallel.

10. A fuel cell assembly structure comprising the plurality of the tube type fuel cells according to claim 1, connected to each other in series, or in parallel, or in zigzags.

* * * * *